(12) United States Patent
Oki et al.

(10) Patent No.: US 11,965,448 B2
(45) Date of Patent: Apr. 23, 2024

(54) CATALYST DEVICE

(71) Applicant: TOYOTA JIDOSHA KABUSHIKI KAISHA, Aichi-ken (JP)

(72) Inventors: Toshinori Oki, Toyota (JP); Tatsuo Iida, Anjo (JP); Takahiro Sadamitsu, Miyoshi (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 18/329,579

(22) Filed: Jun. 6, 2023

(65) Prior Publication Data
US 2023/0399969 A1 Dec. 14, 2023

(30) Foreign Application Priority Data

Jun. 9, 2022 (JP) .................... 2022-093668

(51) Int. Cl.
*F01N 3/28* (2006.01)
*B01D 53/94* (2006.01)
*F01N 3/20* (2006.01)
*F01N 13/18* (2010.01)
*F02B 37/02* (2006.01)

(52) U.S. Cl.
CPC ........... *F01N 3/2882* (2013.01); *B01D 53/94* (2013.01); *F01N 3/2026* (2013.01); *F01N 13/1861* (2013.01); *B01D 2258/01* (2013.01); *F01N 2340/06* (2013.01); *F01N 2470/24* (2013.01); *F02B 37/025* (2013.01)

(58) Field of Classification Search
CPC ..... B01D 53/94; F01N 3/2026; F01N 3/2882; F01N 13/1861; F01N 2340/06; F01N 2470/24; F02B 37/025

USPC ................. 60/280, 300, 303, 320, 605.1
See application file for complete search history.

(56) References Cited

U.S. PATENT DOCUMENTS

| | | | |
|---|---|---|---|
| 2012/0312011 A1* | 12/2012 | Romblom | ............... F01D 9/026 60/605.1 |
| 2016/0115842 A1 | 4/2016 | Mutsuda et al. | |
| 2016/0290209 A1 | 10/2016 | Ogimura et al. | |
| 2017/0107885 A1* | 4/2017 | Tabata | ................. F01N 3/2803 |
| 2018/0252142 A1 | 9/2018 | Kubota et al. | |

(Continued)

FOREIGN PATENT DOCUMENTS

| | | | | |
|---|---|---|---|---|
| DE | 102019210328 A1 * | 1/2021 | ............. F01D 25/30 |
| DE | 102020105330 A1 * | 9/2021 | |

(Continued)

*Primary Examiner* — Jorge L Leon, Jr.
(74) *Attorney, Agent, or Firm* — HAUPTMAN HAM, LLP

(57) ABSTRACT

A catalyst device includes a catalyst, a heating element, and a case. A direction in which exhaust gas flows through an exhaust passage is defined as a gas discharging direction. The case includes an end portion on an upstream side in the gas discharging direction. The heating element includes an end on an upstream side in the gas discharging direction. The end portion of the case is an insulating portion that insulates electricity and protrudes toward an upstream side of the end of the heating element in the gas discharging direction. The catalyst device further includes an outer tube that is separated from the end portion of the case in a radial direction to cover the end portion. The outer tube is formed by a turbine housing that houses a turbine wheel of the forced-induction device.

4 Claims, 3 Drawing Sheets

(56) References Cited

U.S. PATENT DOCUMENTS

| | | | |
|---|---|---|---|
| 2019/0010854 A1* | 1/2019 | Kimura | F02B 37/02 |
| 2019/0078467 A1* | 3/2019 | Jakobcic | F02B 37/00 |
| 2021/0131330 A1* | 5/2021 | Yashiro | F01N 13/18 |
| 2022/0235694 A1* | 7/2022 | Zhang | F01N 3/101 |

FOREIGN PATENT DOCUMENTS

| | | | | |
|---|---|---|---|---|
| EP | 3087260 A1 | 11/2016 | | |
| EP | 3369903 A1 | 9/2018 | | |
| JP | 2008-106685 A | 5/2008 | | |
| JP | 2016-084776 A | 5/2016 | | |
| WO | WO-2009118471 A1 * | 10/2009 | | F01N 13/107 |
| WO | 2015/098674 A1 | 7/2015 | | |

* cited by examiner

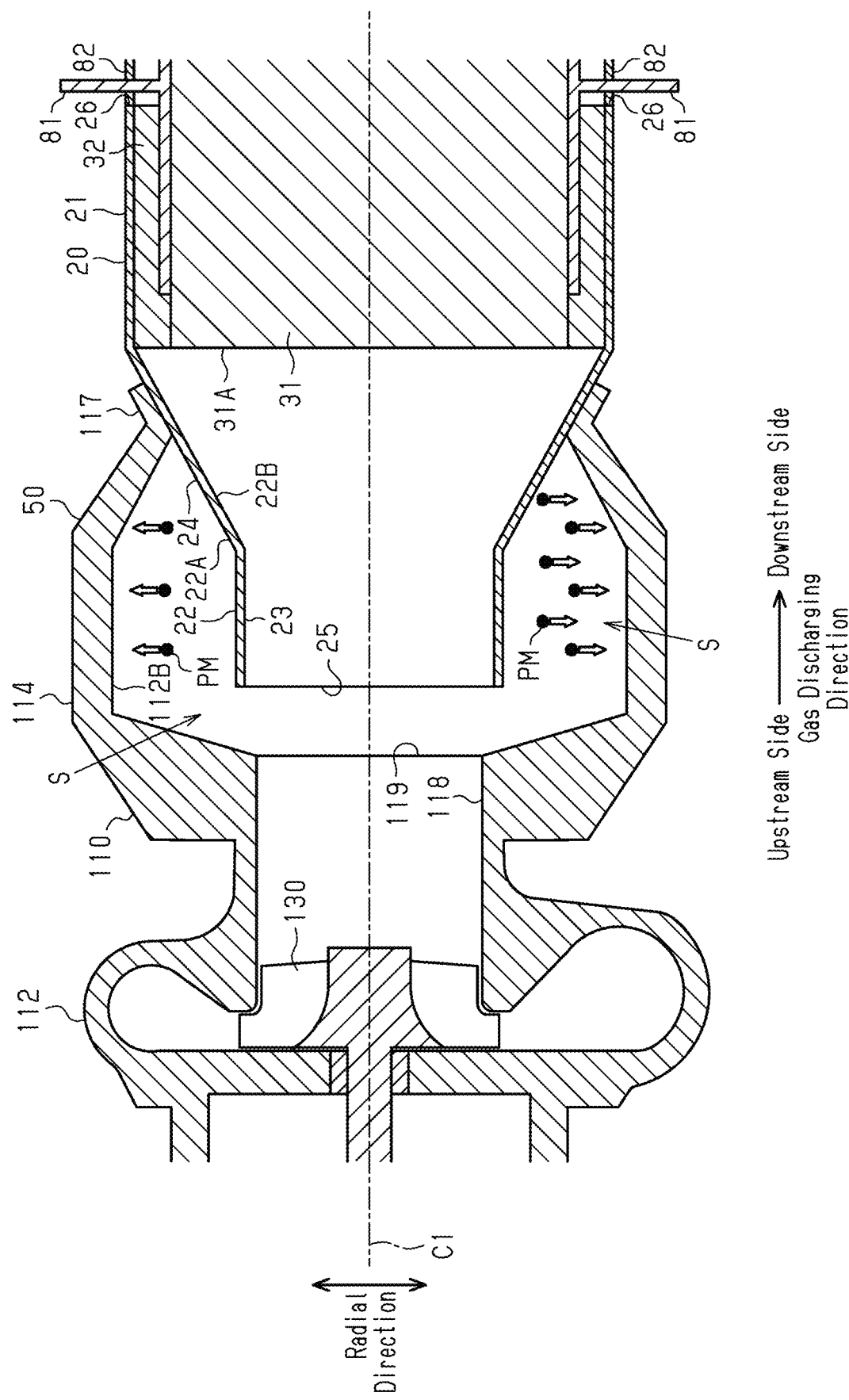

CATALYST DEVICE

RELATED APPLICATIONS

The present application claims priority of Japanese Application Number 2022-093668 filed on Jun. 9, 2022, the disclosure of which is hereby incorporated by reference herein in its entirety.

BACKGROUND

1. Field

The present disclosure relates to a catalyst device including an electrically heated catalyst.

2. Description of Related Art

An electrically heated catalyst that is heated by energizing a heating element has been described. Such a catalyst is accommodated in and attached to a tubular case, while being electrically insulated from the case. Particulate matter or condensed water in exhaust gas may adhere to such an electrically heated catalyst. In this case, short circuits occur between the catalyst and the case, so that current also flows through the case. Therefore, the case is required to have insulation properties.

In order to ensure the insulation properties of the case, for example, the catalyst device disclosed in Japanese Laid-Open Patent Publication No. 2016-84776 includes a case with an end portion formed as an insulating portion.

Even in the catalyst device disclosed in the above publication, particulate matter may be deposited on the insulating portion of the end portion of the case. Therefore, it is necessary to improve the insulation properties at the insulating portion of the case end portion by preventing deposition of particulate matter.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a catalyst device is configured to be disposed in an exhaust passage of an internal combustion engine including a forced-induction device. The catalyst device includes a catalyst configured to purify exhaust gas, a heating element configured to heat the catalyst by generating heat when energized, and a case that is a pipe accommodating the catalyst and the heating element. A direction in which exhaust gas flows through the exhaust passage is defined as a gas discharging direction. The case includes an end portion on an upstream side in the gas discharging direction. The heating element includes an end on an upstream side in the gas discharging direction. The end portion of the case is an insulating portion that insulates electricity and protrudes toward an upstream side of the end of the heating element in the gas discharging direction. The catalyst device further includes an outer tube that is separated from the end portion of the case in a radial direction to cover the end portion. The outer tube is formed by a turbine housing that houses a turbine wheel of the forced-induction device.

When the temperature of the outer tube is lower than the temperature of the end portion of the case, particulate matter collected on the end portion of the case moves to the inner circumferential surface of the outer tube due to thermophoresis. This prevents deposition of particulate matter in the insulating portion. Prevention of deposition of particulate matter in the insulating portion improves the insulation properties of the insulating portion.

In this regard, the outer tube in the above-described configuration is formed by the turbine housing of the forced-induction device. Since such a turbine housing has a large thermal capacity, the temperature rise of the turbine housing is slow, for example, during cold start. This encourages the temperature of the outer tube to be lower than the temperature of the end portion of the case, which is exposed to exhaust gas. This improves the insulation properties of the insulating portion at the end portion of the case.

In the above-described catalyst device, the outer tube may be entirely formed by the turbine housing.

With this configuration, the thermal capacity of the outer tube is larger than that in a case in which part of the outer tube is formed by the turbine housing. This further encourages the temperature of the outer tube to be lower than the temperature of the end portion of the case. This further improves the insulation properties of the insulating portion at the end portion of the case.

In the above-described catalyst device, the end portion of the case may include an edge on an upstream side in the gas discharging direction. A diameter of an outlet of the turbine wheel on a downstream side in the gas discharging direction may be defined as an outlet diameter. A diameter of the edge of the end portion may be set to be larger than the outlet diameter. The outlet is disposed in a gas discharge portion of the turbine housing, and a downstream end of the gas discharge portion includes an opening. The edge is axially separated from the opening such that a distance between the edge and the opening is set to be greater than or equal to a shortest distance sufficient to maintain the insulation properties of the insulating portion when a maximum voltage is supplied to the heating element.

With this configuration, the exhaust gas that has passed through the turbine wheel does not easily flow into the space between the outer tube and the end portion of the case, and most of the exhaust gas flows into the case, which accommodates the catalyst. Therefore, it is possible to limit a decrease in the turbine efficiency of the forced-induction device caused by such a space.

In the above-described catalyst device, the turbine housing may be formed by a casting, and the catalyst device may include the turbine housing.

With this configuration, since the turbine housing is formed by the casting, the thermal capacity of the turbine housing is increased as compared with a case in which the turbine housing is formed by a metal plate. An increase in the thermal capacity of the turbine housing causes the temperature of the turbine housing to be less likely to increase. This encourages the temperature of the outer tube to be lower than the temperature of the end portion of the case.

Other features and aspects will be apparent from the following detailed description, the drawings, and the claims.

BRIEF DESCRIPTION OF THE DRAWINGS

FIG. 3 is a cross-sectional view of a catalyst device according to a modification of the embodiment;

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, except for operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A catalyst device 10 according to an embodiment will now be described with reference to FIGS. 1 and 2.

Internal Combustion Engine

Figure 1:
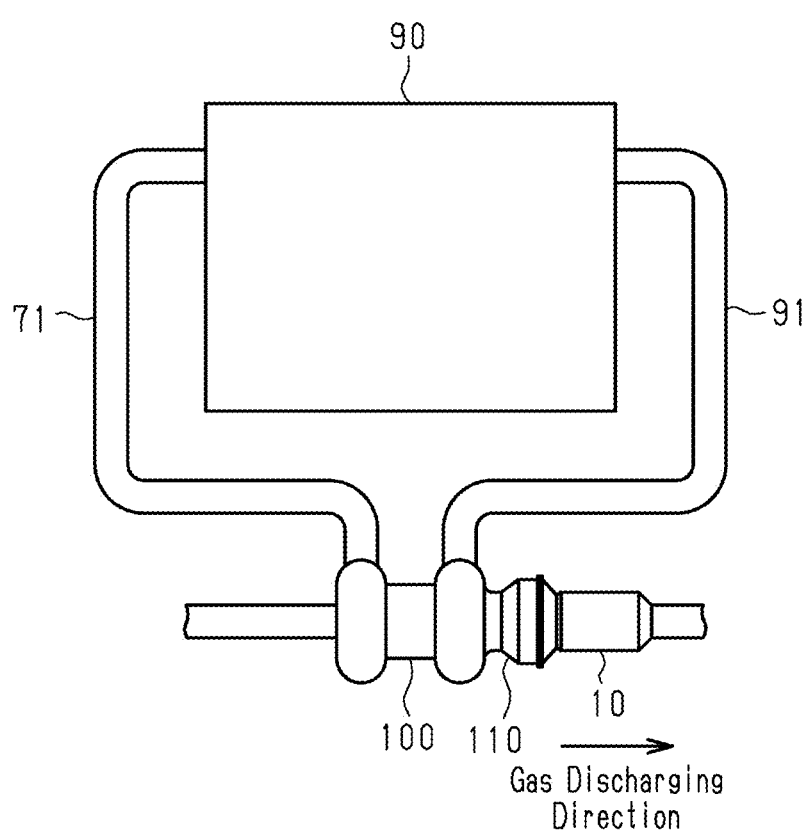
FIG. 1 is a schematic diagram showing an internal combustion engine including a catalyst device according to one embodiment.

As shown in FIG. 1, an internal combustion engine 90 includes a forced-induction device 100 that supercharges intake air flowing through an intake passage 71 using exhaust gas flowing through an exhaust passage 91. The forced-induction device 100 includes a turbine housing 110, which houses a turbine wheel. The catalyst device 10 is connected to the downstream side of the turbine housing 110. The catalyst device 10 is an electrically heated catalyst device and includes a heating element that generates heat when energized. The arrow in FIG. 1 represents a gas discharging direction, which is a flow direction of the exhaust gas discharged from the internal combustion engine.

<Structure of Catalyst Device>

Figure 2:
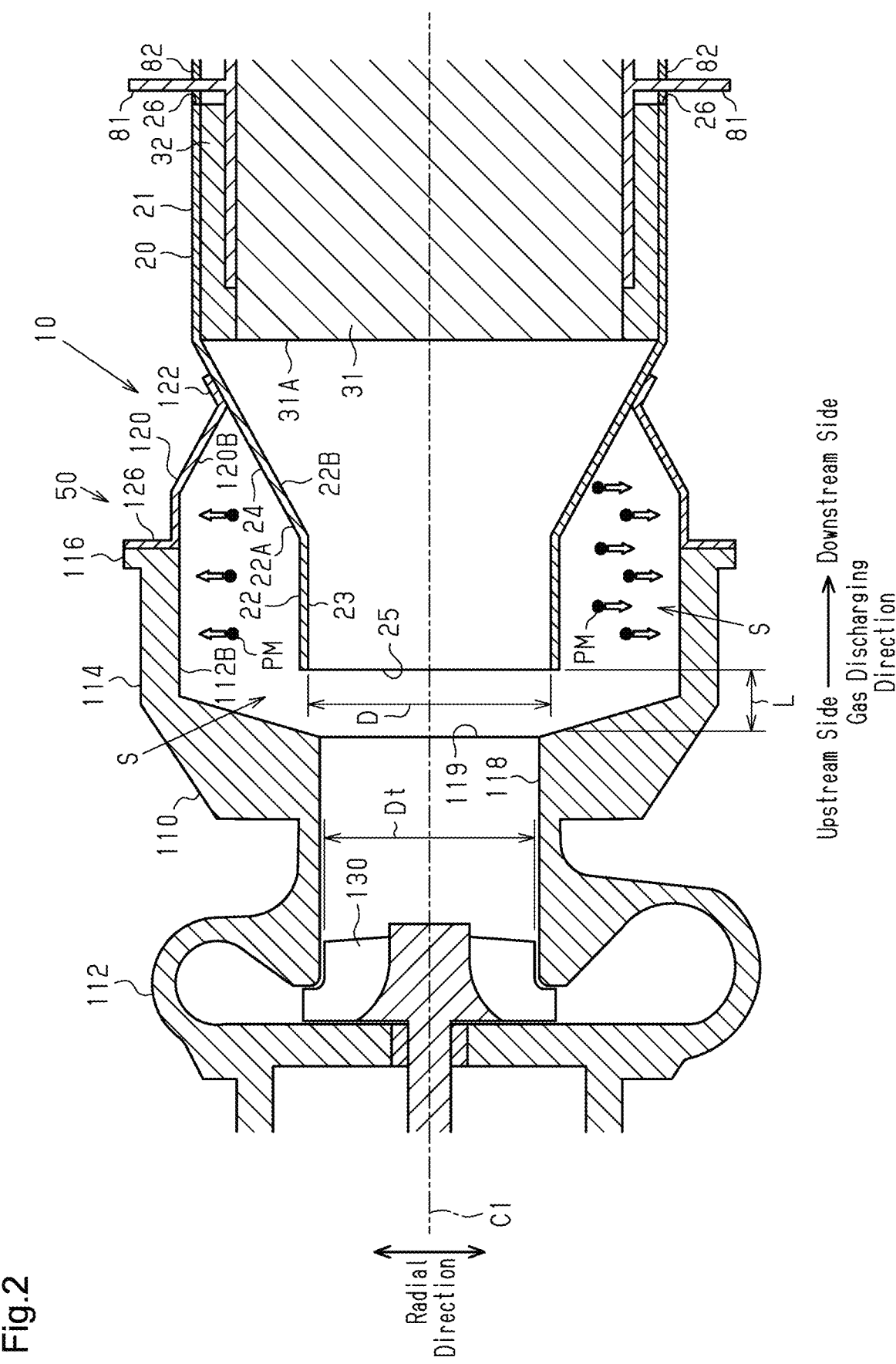
FIG. 2 is a cross-sectional view of the catalyst device according to the embodiment.

FIG. 2 shows an axis C1, which is a straight line extending along the central axis of the catalyst device 10. Like FIG. 1, FIG. 2 shows an arrow indicating a gas discharging direction.

As shown in FIG. 2, the catalyst device 10 includes a catalyst support 31, which supports a catalyst for purifying exhaust gas. The catalyst device 10 includes a case 20, which is a pipe accommodating the catalyst support 31. The catalyst device 10 includes a mat 32, which fixes the catalyst support 31 to an accommodation portion 21 of the case 20. The catalyst device 10 includes two electrodes 81 for energizing the catalyst support 31.

Next, the structure of the catalyst device 10 on the upstream side in the gas discharging direction will be described. The structure on the downstream side in the gas discharging direction may be symmetrical with the structure on the upstream side. Alternatively, the structure on the downstream side may be a single-wall pipe structure with the case 20, which accommodates the catalyst support 31.

The catalyst support 31 has a columnar outer shape with its central axis agreeing with the axis C1. The catalyst support 31 is a porous body. One example of the catalyst support 31 has a honeycomb structure in which channels extending in the gas discharging direction are defined.

As shown in FIG. 2, the electrodes 81 are connected to the catalyst support 31. When a voltage is applied across the electrodes 81, current flows through the catalyst support 31. When current flows through the catalyst support 31, the electrical resistance of the catalyst support 31 causes the catalyst support 31 to generate heat. That is, the catalyst support 31 is an object that generates heat according to the electrical resistance when energized. In other words, the catalyst support 31 is a heating element, which generates heat when energized. The catalyst support 31 is made of, for example, a ceramic containing silicon carbide.

The mat 32 covers a surface that corresponds to the side surface of the column of the catalyst support 31. The mat 32 is an insulating body having a low electric conductivity. The mat 32 is made of, for example, an inorganic fiber having alumina as a major component. Since the catalyst support 31 is covered with the mat 32, no current flows through the case 20 when the catalyst support 31 is energized.

The case 20 is a pipe made of metal such as stainless steel. The axis C1 agrees with a straight line extending along the central axis of the case 20. The case 20 includes the accommodation portion 21 and an end portion 22, which is located on the upstream side in the gas discharging direction of the accommodation portion 21. The catalyst support 31 is accommodated in the case 20 and includes an end face on the upstream side in the gas discharging direction. This end face is referred to as a catalyst upstream end 31A. The end portion 22 of the case 20 is a portion of the case 20 located on the upstream side of the catalyst upstream end 31A. The accommodation portion 21 is a portion of the case 20 located on the downstream side of the catalyst upstream end 31A. A diameter of a circle defined by the inner circumferential surface of the accommodation portion 21 is referred to as an inner diameter of the accommodation portion 21. The length of the inner diameter of the accommodation portion 21 is twice the distance from the axis C1 to the inner circumferential surface of the accommodation portion 21. The inner diameter of the accommodation portion 21 is constant in the direction in which the axis C1 extends. The end portion 22 of the case 20 protrudes further upstream in the gas discharging direction than the catalyst upstream end 31A. The surface of the end portion 22 of the case 20 is covered with an insulating material. The insulating material that covers the entire end portion 22 forms an insulating layer on the end portion 22. Thus, the end portion 22 of the case 20 corresponds to an insulating portion.

The accommodation portion 21 of the case 20 has electrode insertion holes 26, into which the electrodes 81 are inserted. The electrodes 81, which are connected to the catalyst support 31, protrude outside the case 20, via the electrode insertion holes 26. The electrode insertion holes 26 are closed by electrode holding portions 82. The electrode holding portions 82 fix the electrodes 81 inserted in the electrode insertion holes 26. The electrode holding portions 82 are insulating bodies having a low electric conductivity. Since the electrode holding portions 82 support the electrodes 81, current does not flow to the case 20.

The end portion 22 of the case 20 includes a constant diameter portion 23, which is located at the upstream end in the gas discharging direction of the case 20, and a decreasing diameter portion 24, which is located between the constant diameter portion 23 and the accommodation portion 21 to connect the constant diameter portion 23 and the accommodation portion 21 to each other. A diameter of a circle defined by the inner circumferential surface of the constant diameter portion 23 is referred to as an inner diameter D of the constant diameter portion 23. The length of the inner diameter D of the constant diameter portion 23 is twice the distance from the axis C1 to the inner circumferential surface of the constant diameter portion 23. The inner diameter D of the constant diameter portion 23 is constant in the direction in which the axis C1 extends. The inner diameter D of the constant diameter portion 23 is less than the inner diameter of the accommodation portion 21. An edge 25 of the constant diameter portion 23 on the upstream side in the gas discharging direction is an opening through which exhaust gas flows into the case 20.

The decreasing diameter portion 24 of the end portion 22 has the shape of pipe that is tapered such that the distance to the axis C1 decreases toward the upstream end in the gas discharging direction. That is, the inner diameter of an inner circumferential surface 22B of the decreasing diameter portion 24 decreases toward the upstream end in the gas discharging direction.

The catalyst device 10 includes an outer tube 50 that is separated from the end portion 22 of the case 20 in a radial direction to cover the end portion 22. The outer tube 50 is formed by a connecting pipe 120 and an enlarged diameter portion 114 of the turbine housing 110.

The connecting pipe 120 is made of metal such as stainless steel. A downstream end 122 of the connecting pipe 120, which is located at the downstream end in the gas discharging direction, is joined to an outer circumferential surface 22A of the decreasing diameter portion 24. An inner circumferential surface 120B of the connecting pipe 120 is separated in the radial direction from the end portion 22 so as to cover the decreasing diameter portion 24 of the end portion 22. The connecting pipe 120 includes a flange 126 at an upstream end in the gas discharging direction.

The turbine housing 110 is formed by a casting made of a metal material such as cast iron or an aluminum alloy. The turbine housing 110 includes a wheel accommodating portion 112, which accommodates a turbine wheel 130. The turbine housing 110 includes a cylindrical gas discharge portion 118, through which the exhaust gas that has passed through the turbine wheel 130 flows. The central axis of the gas discharge portion 118 agrees with the axis C1. The inner diameter of the gas discharge portion 118 is constant in the direction in which the axis C1 extends. When the diameter of the outlet end of the turbine wheel 130 on the downstream side in the gas discharging direction is defined as an outlet diameter Dt, the inner diameter of the gas discharge portion 118 is slightly larger than the outlet diameter Dt. An opening 119 of the gas discharge portion 118 on the downstream side in the gas discharging direction is located on the upstream side in the gas discharging direction with respect to the edge 25 of the end portion 22. The turbine housing 110 includes the enlarged diameter portion 114. The enlarged diameter portion 114 is formed on the downstream side in the gas discharging direction with respect to the opening 119 of the gas discharge portion 118. The inner diameter of the enlarged diameter portion 114 is larger than the inner diameter of the gas discharge portion 118. An inner circumferential surface 112B of the enlarged diameter portion 114 is spaced apart in the radial direction from the end portion 22 so as to cover the end portion 22. The enlarged diameter portion 114 includes a flange 116 at a downstream end in the gas discharging direction. The flange 116 of the enlarged diameter portion 114 and the flange 126 of the connecting pipe 120 are connected to each other, so that the downstream end of the turbine housing 110 in the gas discharging direction is fixed to the case 20.

The inner diameter D, which is the diameter of the edge 25 of the end portion 22, is set to be larger than the outlet diameter Dt of the turbine wheel 130. The edge 25 is axially separated from the opening 119 such that a distance L between the edge 25 and the opening 119 may be set to or set to be greater than a shortest distance sufficient to maintain insulation properties of the end portion 22 when a maximum voltage is supplied to the catalyst support 31. In the present embodiment, the positional relationship between the edge 25 and the opening 119 is determined such that the distance L between the edge 25 and the opening 119 is set to the shortest distance sufficient to maintain insulation properties of the end portion 22 when the maximum voltage is supplied to the catalyst support 31.

<Operation and Advantages>

Operation and advantages of the present embodiment will now be described.

(1) When the temperature of the outer tube 50 is lower than the temperature of the end portion 22 of the case 20, particulate matter (hereinafter, referred to as PM) collected on the outer circumferential surface 22A of the end portion 22 of the case 20 moves to the inner circumferential surface of the outer tube 50 due to thermophoresis. This prevents deposition of PM at the end portion 22, which is an insulating portion. Prevention of deposition of PM in the insulating portion improves the insulation properties of the insulating portion.

In this regard, the outer tube 50 of the present embodiment is partially formed by the turbine housing 110 of the forced-induction device 100. Since the turbine housing 110 having such a structure has a large thermal capacity, the temperature rise of the turbine housing 110 is slow, for example, during cold start. This encourages the temperature of the outer tube 50 to be lower than the temperature of the end portion 22 of the case 20, which is exposed to exhaust gas. This improves the insulation properties of the insulating portion at the end portion 22 of the case 20.

(2) The inner diameter D, which is the diameter of the edge 25 of the end portion 22, is set to be larger than the outlet diameter Dt of the turbine wheel 130. The edge 25 is axially separated from the opening 119 such that a distance L between the edge 25 and the opening 119 may be set to or set to be greater than a shortest distance sufficient to maintain insulation properties of the end portion 22 when a maximum voltage is supplied to the catalyst support 31. With this structure, the exhaust gas that has passed through the turbine wheel 130 does not easily flow into a space S (refer to FIG. 2) between the outer tube 50 and the end portion 22 of the case 20. Therefore, most of the exhaust gas that has passed through the turbine wheel 130 flows into the case 20. Therefore, it is possible to limit a decrease in the turbine efficiency of the forced-induction device 100 caused by the space S.

(3) In the present embodiment, since the turbine housing 110 is formed by a casting, the volume of the turbine housing 110 is increased as compared with a case in which the turbine housing 110 is formed by a metal plate. This increases the thermal capacity of the turbine housing 110. An increase in the thermal capacity of the turbine housing 110 causes the temperature of the turbine housing 110 to be less likely to increase. On the other hand, since the end portion 22 of the case 20 is exposed to exhaust gas, the temperature of the end portion 22 is easily increased. Although the temperature of the end portion 22 of the case 20 is easily increased, the temperature of the turbine housing 110 is not easily increased. This encourages the temperature of the outer tube 50 to be lower than the temperature of the end portion 22 of the case 20.

(4) The turbine housing 110 is used to form the outer tube 50. Therefore, the size of the catalyst device 10 is less likely to be increased than in a case in which the entire outer tube 50 is formed by the connecting pipe 120 without using the turbine housing 110.

<Modifications>

The above-described embodiment may be modified as follows. The above-described embodiment and the following modifications can be combined as long as the combined modifications remain technically consistent with each other.

The outer tube 50 of the above-described embodiment is formed by the connecting pipe 120 and the turbine housing 110. Alternatively, the entire outer tube 50 may be formed by the turbine housing 110.

FIG. 3 illustrates one example of this modification. As shown in FIG. 3, the catalyst device 10 of the modification does not include the connecting pipe 120. The enlarged diameter portion 114 of the turbine housing 110 includes a downstream end 117 located at an end on the downstream side in the gas discharging direction. The downstream end 117 is joined to the outer circumferential surface 22A of the decreasing diameter portion 24.

With this modification, the thermal capacity of the outer tube 50 is larger than that in a case in which part of the outer tube 50 is formed by the turbine housing 110. This further encourages the temperature of the outer tube 50 to be lower than the temperature of the end portion 22 of the case 20. This further improves the insulation properties of the insulating portion at the end portion 22 of the case 20. In this modification, the downstream end 117 may be joined to the outer peripheral surface of the accommodation portion 21 of the case 20.

In the above-described embodiment, the downstream end 122 of the connecting pipe 120 may be joined to the outer circumferential surface of the accommodation portion 21 of the case 20.

The above-described embodiment illustrates the case 20, which includes the decreasing diameter portion 24. The case 20 does not necessarily include a decreasing diameter portion. For example, the inner diameter of the end portion of the case 20 may be constant in the direction in which the axis along the central axis of the catalyst device extends.

In the above-described embodiment, the case 20 including the constant diameter portion 23 is illustrated. The case 20 does not necessarily include a constant diameter portion. That is, the constant diameter portion may be omitted from the end portion 22 of the case 20. For example, a pipe may be employed in which the distance to the central axis of the catalyst device decreases toward the upstream end in the gas discharging direction.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A catalyst device for an exhaust passage of an internal combustion engine including a forced-induction device, the catalyst device comprising:
   a catalyst support configured to purify exhaust gas, the catalyst support including a catalyst upstream end;
   a heating element configured to heat the catalyst support by generating heat when energized;
   a case of the exhaust passage formed as a pipe configured to accommodate the catalyst support and the heating element, the case including an upstream end portion which protrudes upstream of the catalyst upstream end; and
   an outer tube configured to be radially separated from the case so as to concentrically overlap with the upstream end portion of the case,
   wherein the upstream end portion of the case is an insulating portion configured to insulate electricity, and
   wherein the outer tube is at least partially defined by a turbine housing that houses a turbine wheel of the forced-induction device.

2. The catalyst device according to claim 1, wherein the outer tube is entirely defined by the turbine housing.

3. The catalyst device according to claim 1, wherein:
   an upstream end of the insulating portion of the case includes an edge,
   a downstream end of the turbine wheel includes an outlet,
   a diameter of the edge is set to be greater than a diameter of the outlet,
   the outlet is disposed in a gas discharge portion of the turbine housing, and a downstream end of the gas discharge portion includes an opening, and
   the edge is axially separated from the opening such that a distance between the edge and the opening is set to a shortest distance sufficient to maintain insulation properties of the insulating portion when a maximum voltage is supplied to the heating element.

4. The catalyst device according to claim 1, wherein the turbine housing is formed by a casting.

* * * * *